Patented July 18, 1950

2,515,483

UNITED STATES PATENT OFFICE 2,515,483

DIACYLATED PTEROIC ACID AND PROCESS FOR PREPARING SAME

Donald E. Wolf, Rahway, and Karl Folkers, Plainfield, N. J., assignors to Merck & Co., Inc., Rahway, N. J., a corporation of New Jersey No Drawing. Application August 10, 1946, Serial No. 689,814

12 Claims. (Cl. 260—251)

This invention relates to new chemical compounds. More particularly, it is concerned with the acyl derivatives of rhizopterin and related compounds, which are useful for promoting the growth of microorganisms, and can also be considered as new nutritional factors. These new compounds are further useful in elucidating and studying the structure of other complex organic compounds, and in synthesizing other new growth factors.

The compounds forming the subject matter of the present invention 4-([(2-acylamino-4-hydroxy-6-pteridyl)methyl]acylamino)benzoic acid can be represented by the formula:

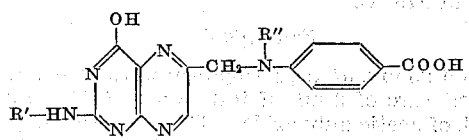

wherein R' represents an acyl substituent and R" represents an acyl substituent of the class consisting of the formyl group and the acyl group R'.

In accordance with our invention these new compounds may be prepared by acylating compounds of the general formula:

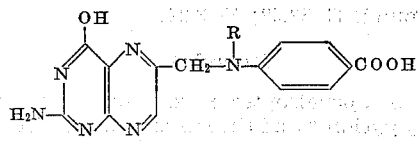

wherein R represents hydrogen and formyl substituents. A compound of this general structure wherein R is a formyl group is fully defined by the chemical name 4-([(2-amino-4-hydroxy-6-pteridyl)methyl]formylamino)benzoic acid and will hereinafter be referred to as rhizopterin. This compound, rhizopterin, is the pterin-like acidic chemical compound obtained from fumaric acid fermentation liquor. This general process and rhizopterin thereby secured is disclosed and claimed in a copending application to our colleagues, Keresztesy and Rickes, Serial No. 536,434, filed May 19, 1944, now Patent No. 2,478,404.

A compound of the above formula wherein R is hydrogen is fully defined by the chemical name 4-([(2-amino-4-hydroxy - 6 - pteridyl)methyl]amino)benzoic acid and will hereinafter be referred to as aporhizopterin. This compound, aporhizopterin, is obtained by alkaline deacylation of rhizopterin in accordance with a procedure described in the copending application by our colleagues, Keresztesy and Rickes, Serial No. 731,868, filed March 1, 1947. Since rhizopterin contains one formyl group in the molecule, it is capable of adding one additional acyl substituent. While aporhizopterin contains no acyl groups, it is capable of adding two acyl substituents to the molecule. It will be apparent that formylation of rhizopterin or aporhizopterin results in the same compound, 4-([(2-formylamino-4-hydroxy-6-pteridyl)methyl]formylamino)-benzoic acid, which is referred to as formyl rhizopterin.

The process in accordance with our invention comprises reacting rhizopterin or aporhizopterin with an acylating agent and recovering the acyl derivative of these compounds. Rhizopterin or aporhizopterin can either be reacted with the required quantity of the acyl compound in the presence of an organic solvent or an excess of the acylating compound can be employed for a solvent effect. The reaction mixture is heated until all of the solid material present has been dissolved. After completion of the reaction, the organic solvent and excess acylating agent may be removed by evaporation. Alternatively, any excess acylating agent present in the reaction mixture can be decomposed with alcohol and the acylated derivative precipitated from ether. A pure compound can be obtained by dissolving the crude acyl derivative of rhizopterin or aporhizopterin in ammonium hydroxide and acidifying the solution with acetic acid to precipitate the acylated derivative. It has been found that formyl rhizopterin can not be crystallized in this manner since treatment of this compound with alkali and acid hydrolyzes the formyl group in the 2-position and rhizopterin is obtained.

The following examples set forth a method of carrying out the present invention, but it is to be understood that these examples are given by way of illustration and not of limitation.

Example 1

Approximately 9 mg. of rhizopterin were refluxed with 2 ml. of formic acid (98%) until all of the solid had dissolved. The solution was then concentrated to dryness in vacuo. The formyl rhizopterin, i. e. 4-([(2-formylamino-4-hydroxy-6-pteridyl)methyl]formylamino)benzoic acid was deposited as a nearly white solid residue which was dried at 140° C. for analysis.

*Anal.*—Calcd. for $C_{16}H_{12}N_6O_5$: N, 22.82. Found: N, 22.70.

Example 2

Approximately 23 mg. of rhizopterin were suspended in a mixture of 1 cc. pyridine and 1 cc. acetic anhydride. The mixture was heated on a steam bath for 30 minutes to achieve complete solution, and was then concentrated to dryness in vacuo. The solid residue obtained consisted of acetyl rhizopterin, i. e. 4-([(2-acetylamino-4-hydroxy - 6 - pteridyl) methyl]formylamino) benzoic acid. A pure compound was obtained by dissolving the crude product in dilute ammonium hydroxide and acidifying the solution with acetic acid at a temperature of 90° to 100° C. to effect precipitation of the nearly white crystalline solid. Acetyl rhizopterin showed activity in promoting growth of S. lactis R.

*Anal.*—Calcd. for $C_{17}H_{14}N_6O_5$: C, 53.40; H, 3.69; N, 21.98. Found: C, 53.83; H, 4.01; N, 22.65.

Example 3

Approximately 10 mg. of rhizopterin were dissolved in acetic anhydride by heating at 100° C. The excess acetic anhydride was evaporated in vacuo leaving a nearly white residue of acetyl rhizopterin. Purification was accomplished by dissolving the crude product in dilute ammonium hydroxide and acidifying with acetic acid at 90° C. until the acetyl rhizopterin precipitated.

The pure compound has the following characteristic ultra-violet absorption spectrum:

|         | Wave lengths in Å. | E%   |
|---------|--------------------|------|
| pH: 11  | 2,575              | 985  |
|         | 3,530              | 190  |
| pH: 7   | 2,575              | 569  |
|         | 3,400              | 191  |

Example 4

9 mg. of rhizopterin were dissolved in 1 cc. of methoxyacetic anhydride by heating the mixture on a steam bath for 2 hours. The excess methoxyacetic anhydride was decomposed with methanol and the solution was concentrated in vacuo to a small volume. Addition of ether to the mixture caused precipitation of methoxyacetyl rhizopterin, i. e. 4-([(2-methoxyacetylamino - 4 - hydroxy-6-pteridyl)methyl]formylamino)benzoic acid. This product was purified by dissolving the crude product in dilute ammonium hydroxide and acidifying the solution with acetic acid. The methoxyacetyl rhizopterin obtained had a melting range of 258–268° C.

*Anal.*—Calcd. for $C_{18}H_{16}N_6O_6$: methoxyl, 7.52. Found: methoxyl, 5.04, 5.12.

Example 5

15 mg. of rhizopterin were treated with approximately 3 cc. of benzoic anhydride at 180–200° C. until all solid matter was dissolved. The excess benzoic anhydride was decomposed with alcohol and the solution was diluted with petroleum ether. Benzoyl rhizopterin, i. e. 4-([(2-benzoylamino - 4 - hydroxy-6-pteridyl)methyl]-formylamino)benzoic acid precipitated from the mixture. A pure compound was obtained by dissolving the crude product in dilute ammonium hydroxide and slowly acidifying the solution with acetic acid. The pure benzoyl rhizopterin obtained in this manner had a melting point of 255–258° C. It was biologically active in the growth of S. lactis R.

Example 6

8 mg. of rhizopterin were suspended in 2 cc. pyridine and treated with 0.2 g. of phenylacetic anhydride. The mixture was heated at 100° C. until all solids were dissolved. The solution was concentrated in vacuo leaving a brown oil as a residue. Addition of ether caused precipitation of phenylacetyl rhizopterin, i. e. 4-([(2-phenylacetylamino - 4 - hydroxy - 6 - pteridyl) methyl]-formylamino)benzoic acid. Purification was accomplished by dissolving the crude product in dilute ammonium hydroxide and slowly acidifying the solution with acetic acid until the phenylacetyl rhizopterin precipitated. The pure product had a melting point of 276° C.

*Anal.*—Calcd. for $C_{23}H_{18}N_6O_5$: C, 60.26; H, 3.96; N, 18.34. Found: C, 60.51; H, 4.42; N. 18.55.

Example 7

Approximately 8 mg. of rhizopterin were dissolved in an excess of phenylacetic anhydride by heating on the steam bath. The excess phenylacetic anhydride was decomposed by addition of methanol and the resulting solution was concentrated in vacuo to a small volume. Addition of ether caused precipitation of the phenylacetyl rhizopterin, i. e. 4-([(2-phenylacetylamino-4-hydroxy - 6 - pteridyl)methyl]formylamino)-benzoic acid. This crude product was purified by dissolving it in dilute ammonium hydroxide and slowly acidifying the solution with acetic acid at 90–100° C. Pure phenylacetyl rhizopterin crystallized in white needles having a melting point of 276° C.

Example 8

About 25 mg. of aporhizopterin were suspended in a mixture of 2 ml. of formic acid (88%) and 0.7 ml. of acetic anhydride. The mixture was refluxed until all of the solid material had dissolved. The solution was then concentrated to dryness. The solid residue obtained consisted of formyl rhizopterin. This residue was dissolved in dilute ammonium hydroxide and acidified with acetic acid whereupon rhizopterin precipitated as a pure crystalline product.

*Anal.*—Calcd. for $C_{15}H_{12}N_6O_4$: C, 52.94; H, 3.56. Found: C, 52.57; H, 3.24.

Example 9

9 mg. of aporhizopterin were suspended in 1 cc. of dry pyridine and the suspension was treated with 1 cc. of acetic anhydride at 100° C. for 16 hours. After nearly all solid matter had dissolved, the solution was evaporated in vacuo leaving acetyl aporhizopterin, i. e. 4-([2-acetylamino - 4 - hydroxy-6-pteridyl)methyl]acetyl-amino)benzoic acid as a nearly white solid. This crude product was purified by dissolving it in dilute ammonium hydroxide and acidifying the solution with acetic acid. Pure acetyl aporhizopterin crystallized out in micro needles.

*Anal.*—Calcd. for $C_{18}H_{16}N_6O_5$: C, 54.54; H, 4.07. Found: C, 54.44; H, 3.98.

Example 10

10 mg. of aporhizopterin were refluxed in acetic anhydride until almost all material had dissolved. The solution was evaporated in vacuo leaving acetyl aporhizopterin as a residue. This crude product was purified by dissolving in dilute ammonium hydroxide and slowly acidifying the solution with acetic acid. Pure acetyl aporhizopterin was obtained as nearly white crystals.

The pure compound has the following characteristic ultraviolet absorption spectrum:

|  | Wave lengths in Å. | E% |
|---|---|---|
| pH: 11 | 2,550 | 1,000 |
|  | 3,500 | 213 |
| pH: 7 | 2,550 | 555 |
|  | 3,400 | 209 |
| pH: 1 | 2,350 | 600 |
|  | 2,800 | 465 |
|  | 3,300 | 219 |

Modifications may be made in carrying out the present invention without departing from the spirit and scope thereof, and we are to be limited only by the appended claims.

We claim:
1. As a new composition of matter, a compound having the structural formula

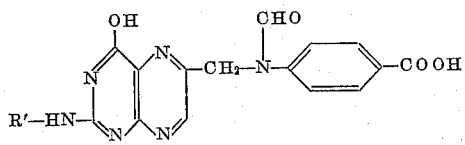

wherein R' is selected from the group which consists of formyl, acetyl, methoxyacetyl, benzoyl and phenylacetyl radicals.

2. 4-([(2-formylamino-4-hydroxy-6-pteridyl)-methyl]formylamino)benzoic acid.

3. 4 - ([(2-acetylamino-4-hydroxy-6-pteridyl)-methyl]formylamino)benzoic acid.

4. 4-([(2 - benzoylamino-4-hydroxy - 6 - pteridyl)methyl]formylamino)benzoic acid.

5. 4-([(2 - methoxyacetylamino - 4 - hydroxy-6-pteridyl)methyl]formylamino)benzoic acid.

6. 4 - ([(2 - phenylacetylamino - 4 - hydroxy-6-pteridyl)methyl]formylamino)benzoic acid.

7. The process that comprises reacting a compound of the formula

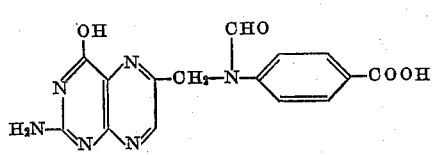

with an acylating agent selected from the group which consists of formic acid, acetic anhydride, methoxyacetic anhydride, benzoic anhydride and phenylacetic anhydride and recovering a compound of the formula

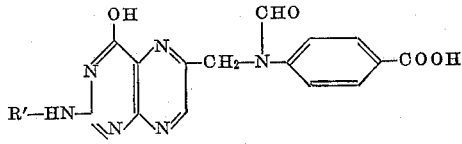

wherein R' is the corresponding acyl radical.

8. The process that comprises reacting 4-([(2-amino-4-hydroxy - 6 - pteridyl)methyl]formylamino)benzoic acid with formic acid and recovering 4-([(2 - formylamino-4-hydroxy-6-pteridyl)-methyl]formylamino)benzoic acid.

9. The process that comprises reacting 4-([(2-amino-4-hydroxy - 6 - pteridyl)methyl]formylamino)benzoic acid with acetic anhydride and recovering 4 - ([(2 - acetylamino - 4 - hydroxy-6-pteridyl)methyl]formylamino)benzoic acid.

10. The process that comprises reacting 4-([(2-amino-4-hydroxy - 6 - pteridyl)methyl]formylamino)benzoic acid with benzoic anhydride and recovering 4-([(2 - benzoylamino - 4 - hydroxy-6-pteridyl)-methyl]formylamino)benzoic acid.

11. The process that comprises reacting 4-([(2-amino-4-hydroxy - 6 - pteridyl)methyl]formylamino)benzoic acid with methoxyacetic anhydride and recovering 4 - ([(2 - methoxyacetylamino-4-hydroxy - 6 - pteridyl)methyl]formylamino)benzoic acid.

12. The process that comprises reacting 4-([(2-amino-4-hydroxy - 6 - pteridyl)methyl]formylamino)benzoic acid with phenylacetic anhydride and recovering 4-([(2-phenylacetylamino-4-hydroxy - 6 - pteridyl)methyl]formylamino)benzoic acid.

DONALD E. WOLF.
KARL FOLKERS.

REFERENCES CITED

The following references are of record in the file of this patent:

UNITED STATES PATENTS

| Number | Name | Date |
|---|---|---|
| 2,442,836 | Angier | June 8, 1948 |

FOREIGN PATENTS

| Number | Country | Date |
|---|---|---|
| 206,454 | Germany | Feb. 23, 1908 |

OTHER REFERENCES

Textbook of Organic Chemistry by George H. Richter, 1938 edition (Wiley) pp. 236 and 499.
Science, May 31, 1946, pp. 667–669.